M. KAUKEINEN.
POST HOLE DIGGER.
APPLICATION FILED JUNE 11, 1912.
1,065,874.
Patented June 24, 1913.
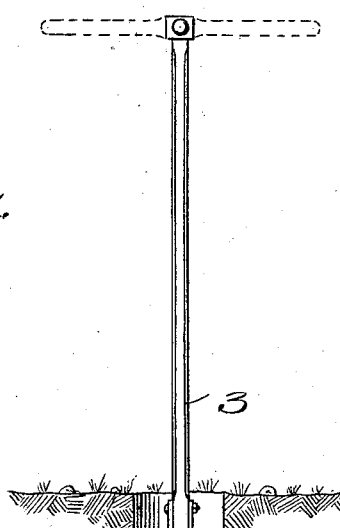
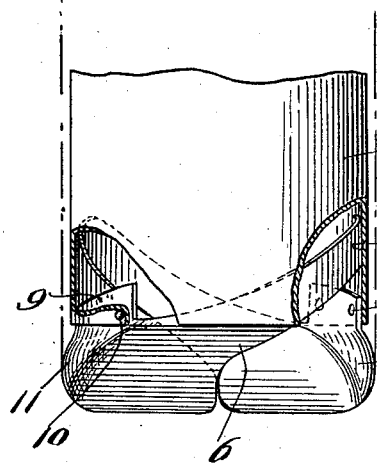
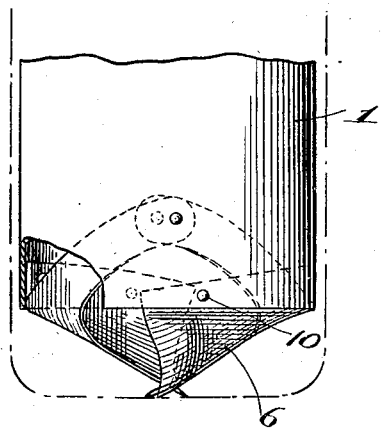
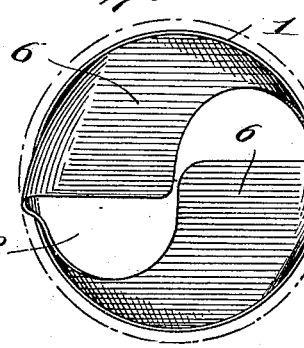

UNITED STATES PATENT OFFICE.

MATTHEW KAUKEINEN, OF TULAROSA, NEW MEXICO.

POST-HOLE DIGGER.

1,065,874.  Specification of Letters Patent.  Patented June 24, 1913.

Application filed June 11, 1912. Serial No. 703,045.

*To all whom it may concern:*

Be it known that I, MATTHEW KAUKEINEN, a citizen of the United States, residing at Tularosa, in the county of Otero and State of New Mexico, have invented new and useful Improvements in Post-Hole Diggers, of which the following is a specification.

This invention relates to improvements in post hole diggers, and its object is to provide a post hole digger which shall be very simple and inexpensive in its construction, and by means of which a hole of the required extent may be formed in a very facile manner and in relatively quick time.

The improved post hole digger comprehends a cylindrical body which is open at its ends and which has at its lower end cutting blades disposed in auger-like relation, said blades being of such outline that they mutually coact in defining spiral conduits which lead into the cylindrical body and through which the earth displaced by said blades is forced.

An embodiment of the invention is illustrated in the accompanying drawings, wherein:

Figure 1 is an elevation, partly in section, showing the implement in use; Fig. 2 is an enlarged elevation partly in section, showing more particularly the construction of the blades; Fig. 3 is a similar view in a plane at right angles to the plane of Fig. 2; and Fig. 4 is a bottom plan view of the implement.

Similar characters of reference designate corresponding parts throughout the several views.

The cylindrical body, to which reference has been made, is indicated by the numeral 1, and is open at its ends, at its upper end being provided with a bail 2, to which the shank of a handle 3 is attached.

The cylindrical body 1 is provided at its lower end with blades indicated generally at 5, which may be counter-parts and which are of novel construction and arrangement. Each blade 5 comprehends a relatively flat portion 6, which is arranged in spirally inclined relation and gradually increases in effective width toward its outer end, at which it has a cutting edge. The inner end portions of the parts 6 are gradually turned to approach or coincide with the vertical plane of the cylinder 1, and are suitably attached to said cylinder as by rivets 8. Adjacent their outer ends the parts 6 are provided with upwardly directed lugs or flanges 9, which are of arcuate outline, corresponding to the outline of the cylinder 1, to which they may be connected by rivets 10. The flanges 9, between the lower edge of the cylinder 1 and the cutting edge of the blades 5, are preferably bulged as at 11, so as to project slightly beyond the circumference of said cylinder. The bulges 11 immediately adjoin the cutting edges 7, and are instrumental in providing sufficient clearance to enable the cylindrical body 1 to be readily moved into, or withdrawn from, the hole which is produced by the blades 5.

It will be observed that the blades are arranged in opposite relation, and that their cutting edges adjoin one another and are coincidentally disposed along a diameter of the cylinder 1. The cutting edges of one blade confront the spirally directed and inwardly tapering parts 6 of the other blade, and by virtue of this relation, a relatively large mouth 12 is afforded, through which the earth displaced by the adjoining blade is forced, such earth then passing upwardly and spirally along the portion 6 of the blade by which it is displaced. The bulge 11 above referred to immediately adjoins the mouth 12 and, in effect, increases the efficient size of said mouth, so that the passage of the earth along the spiral 6 is readily and conveniently effected.

In use, the implement is rotated under pressure, and is forced downwardly into the earth to the desired extent. As a consequence of such rotation, a well formed hole of uniform diameter and of substantially greater diameter than the body 1 is produced. During the rotation of the implement, the cutting jaws 5 continuously take the earth from the bottom of the hole, and the earth thus displaced by said edges passes in an upward, relatively spiral path through the mouths 12 and along the portions 6, into the cylinder 1, from which it may be readily removed when the occasion may require by simply withdrawing the cylinder from the opening and shaking or otherwise effecting the dislodgment of the dirt contained therein.

Owing to the relatively spiral feed of the dirt, the dirt in the cylinder is not apt to become packed, even when the cylinder is as full as its capacity permits, and in case it should become packed, the dislodgment of said dirt may be very readily and quickly effected.

It will be observed that the operations above described entail no separately manipulable adjuncts, but are consequent simply to a rotation of the implement in the manner set forth.

The implement is of very strong and durable nature, inasmuch as the cylinder 1 may be made in a solid piece, and the blades 5 may be rigidly secured to the lower end of said cylinder. It will further be noted that the bulges 11, which, as stated, provide a clearance for the cylinder 1, and also enlarge the mouths 12 through which the dirt passes, materially strengthen the connection between the blades and the cylinder, as will be obvious.

Having fully described my invention, I claim:

A post hole digger comprising a rotatable cylindrical open ended body and a pair of spirally directed blades permanently secured at the lower end thereof in opposite relation and having straight cutting edges which adjoin substantially on a diameter of said body and are conjointly substantially coextensive with said diameter, the blades including substantially flat spiral portions which gradually increase in width toward said cutting edges and are gradually turned into the plane of said body, the blades adjacent said cutting edges being formed with curved attachment flanges which conformably lie against and are secured to said body, and below the body and adjacent their junctions with the cutting edges have bulged portions which project beyond the circumference of the body, the cutting edge of one blade confronting the spirally directed edge of the adjacent blade whereby throat ways of substantial extent are afforded through which the dirt displaced by said cutting edges passes in a relatively spiral direction along said flat spiral portions and into said body.

In testimony whereof I have hereunto set my hand in presence of two subscribing witnesses.

MATTHEW KAUKEINEN.

Witnesses:
MILTON WILLIAMS,
FRANK McDONALD.

---

Copies of this patent may be obtained for five cents each, by addressing the "Commissioner of Patents, Washington, D. C."